(12) United States Patent
Cui et al.

(10) Patent No.: US 8,394,901 B2
(45) Date of Patent: Mar. 12, 2013

(54) BI-COMPONENT CATALYST SYSTEM FOR ISOPRENE OR BUTADIENE CIS 1, 4-POLYMERIZATION AND POLYMERIZATION PROCESS

(75) Inventors: Dongmei Cui, Changchun (CN); Xinli Liu, Changchun (CN); Dongtao Liu, Changchun (CN); Wei Gao, Changchun (CN); Shihui Li, Changchun (CN); Lingfang Wang, Changchun (CN); Zhichao Zhang, Changchun (CN)

(73) Assignee: Changchun Institute of Applied Chemistry Chinese Academy of Sciences, Changchun, Jilin Province (CN)

( * ) Notice: Subject to any disclaimer, the term of this patent is extended or adjusted under 35 U.S.C. 154(b) by 392 days.

(21) Appl. No.: 12/747,490

(22) PCT Filed: Apr. 28, 2009

(86) PCT No.: PCT/CN2009/000449
§ 371 (c)(1),
(2), (4) Date: Jun. 10, 2010

(87) PCT Pub. No.: WO2009/132514
PCT Pub. Date: Nov. 5, 2009

(65) Prior Publication Data
US 2010/0286350 A1    Nov. 11, 2010

(30) Foreign Application Priority Data

Apr. 29, 2008 (CN) .......................... 2008 1 0050666
Dec. 25, 2008 (CN) .......................... 2008 1 0051671

(51) Int. Cl.
C08F 4/44 (2006.01)
C08F 4/52 (2006.01)
B01J 31/00 (2006.01)
B01J 31/26 (2006.01)

(52) U.S. Cl. ........ 526/164; 526/172; 526/161; 526/335; 526/340.2; 526/340.4; 502/102

(58) Field of Classification Search ...... 556/1; 526/164, 526/172, 161, 335, 340.2, 340.4
See application file for complete search history.

(56) References Cited

U.S. PATENT DOCUMENTS

| | | | |
|---|---|---|---|
| 4,468,496 A | 8/1984 | Takeuchi et al. | |
| 6,391,990 B1 | 5/2002 | Ishino et al. | |
| H2036 H | 7/2002 | Bush | |
| 6,596,828 B1 | 7/2003 | Kaito et al. | |
| 6,683,140 B2 | 1/2004 | Kaita et al. | |
| 6,713,565 B2 | 3/2004 | Burkhart et al. | |
| 6,838,526 B1 | 1/2005 | Sone et al. | |
| 6,838,534 B2 | 1/2005 | Laubry | |
| 6,858,686 B2 | 2/2005 | Laubry | |
| 6,949,489 B1 | 9/2005 | Barbotin et al. | |
| 6,960,631 B2 | 11/2005 | Kaita et al. | |
| 6,992,157 B2 | 1/2006 | Laubry | |
| 7,022,783 B2 | 4/2006 | Hsu et al. | |
| 2002/0119889 A1 | 8/2002 | Kaita et al. | |
| 2003/0065083 A1 | 4/2003 | Sone et al. | |
| 2005/0009979 A1 | 1/2005 | Tanaka et al. | |
| 2005/0137338 A1 | 6/2005 | Halasa et al. | |

FOREIGN PATENT DOCUMENTS

| | | | |
|---|---|---|---|
| CN | 1599762 A | | 3/2005 |
| CN | 101186663 A | | 5/2008 |
| CN | 101186663 B | * | 5/2010 |
| EP | 0652240 A1 | | 5/1995 |
| EP | 1840130 A1 | | 10/2007 |

OTHER PUBLICATIONS

Gao, W. and Cui, D., J. Am. Chem. Soc. 2008, 130, 4984-4991.*
Gao, et al., Highly cis-1,4 Selective Polymerization of Dienes with Homogeneous Ziegler-Natta Catalysts Based on NCN-Pincer Rare Earth Metal Dichloride Precursors, Journal of the American Chemical Society, 2008, vol. 130, pp. 4984-4991.
International Search Report for PCT/CN2009/000449 dated Aug. 6, 2009.
Written Opinion for PCT/CN2009/000449 dated Aug. 6, 2009 (in Chinese).
Supplementary European Search Report issued on Dec. 28, 2011 for International Application No. PCT/CN2009/000449.

* cited by examiner

*Primary Examiner* — Rip A. Lee

(74) *Attorney, Agent, or Firm* — Knobbe, Martens, Olson & Bear, LLP

(57) ABSTRACT

An isoprene or butadiene cis 1,4-selective polymerization catalyst system together with its polymerization method is provided. This catalyst system is composed of NCN-imine pincer type rare earth metal complex of formula [2,6-$(CH=N-R^1)_2$-4-$R^2$-1-$C_6H_2$]$LnX_2(THF)_n$ and alkylating reagent. In an hydrocarbon solvent or under bulk conditions, at a polymerization temperature in a range of –20-120° C., the conjugated diene is polymerized by using the catalyst system, to produce polyisoprene and polybutadiene having controllable number-average molecular weight, molecular weight distribution of 3.0 or less than, and cis 1,4-content of 95% or more, even 99% or more. The crude rubber and vulcanized rubber of the polyisoprene have high strength, stretching crystallization capability and transparency.

20 Claims, 1 Drawing Sheet

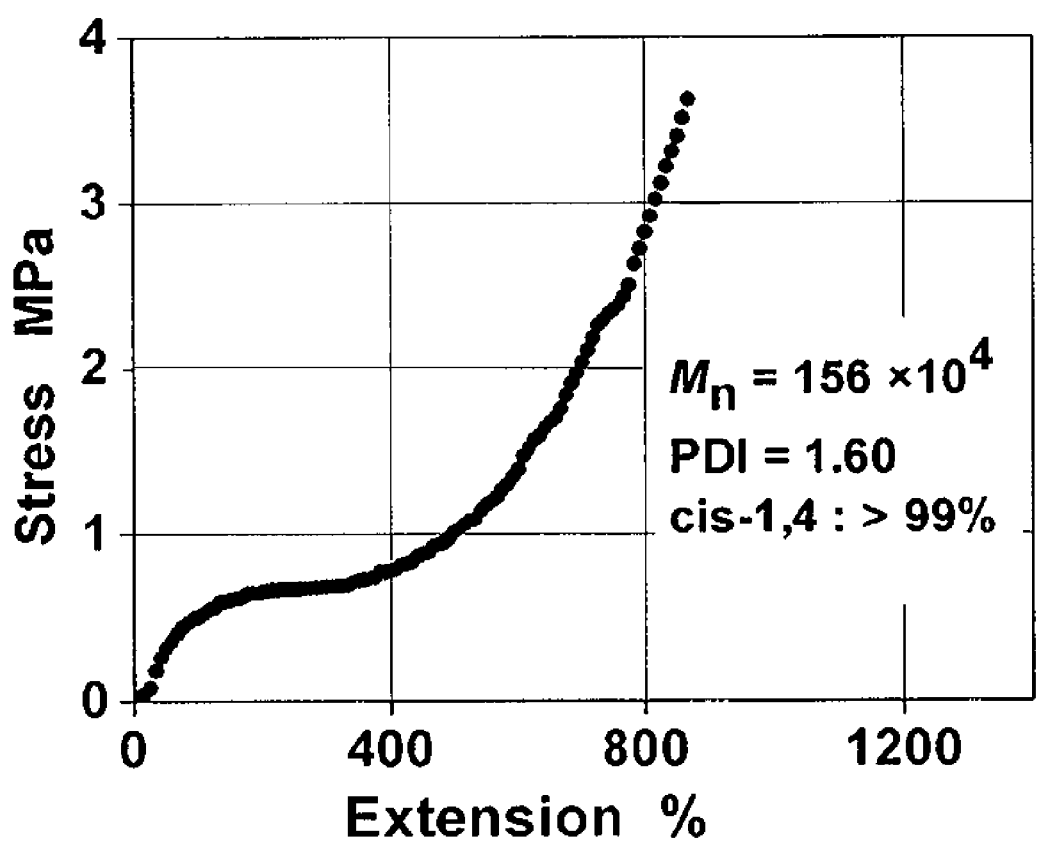

BI-COMPONENT CATALYST SYSTEM FOR ISOPRENE OR BUTADIENE CIS 1, 4-POLYMERIZATION AND POLYMERIZATION PROCESS

This application is U.S. National Phase of International Application PCT/CN2009/000449, filed Apr. 28, 2009 designating the U.S., and published in Chinese as WO 2009/132514 on Nov. 5, 2009, which claims priority to Chinese Patent Application Nos. 200810050666.2, filed Apr. 29, 2008 and 200810051671.5, filed Dec. 25, 2008.

TECHNICAL FIELD

The present invention relates to the field of the isoprene or butadiene cis 1,4-selective polymerizations, and specifically, a bi-component catalyst system useful for the isoprene or butadiene cis 1,4-selective polymerization, as well as a process for preparing a highly cis-1,4 regulated polymers by catalyzing the isoprene or butadiene polymerization using this catalyst system.

BACKGROUND ART

Highly cis 1,4-regulated polybutadiene and 1,4-regulated polyisoprene are two kinds of synthetic rubbers with superior compositive performances, which finds wide applications in civil application, automobile, airplane manufacturing, aviation or the like. Specifically, when the cis 1,4-content in the structure of polyisoprene is high as 99%, the performance of the polyisoprene can compare with that of a natural rubber. Since 1960s when a rare earth metal compound for catalyzing diene polymerization is invented for the first time in China, large numbers of rubber companies have developed a series of catalyst systems on this basis and applied a series of patents. As compared with the catalyst systems based on other metals such as titanium, nickel or the like, the rare earth metal catalyst system is superior in catalytic activity and cis 1,4-selectivity for the polymerizations of isoprene and butadiene. Additionally, the obtained polyisoprene and polybutadiene rubbers have excellent compositive performances, such as the features of less gel, easy processability, wearing resistance, tearing resistance and highly crude rubber strength or the like. However, the formulations of the catalyst systems disclosed in these patents generally use rare earth metal carboxylates as the major catalysts, and are approximately divided into: insoluble bi-component systems, for example, neodymium chloride/a Lewis acid such as an alcohol, an amine, phosphoric acid or the like; soluble three-component neodymium-containing systems, for example, a neodymium carboxylate/an alkylating reagent (such as, an aluminum alkyl)/halide; and the recently developed four-component catalyst systems, for example, a neodymium carboxylate/an alkylating reagent (such as, an aluminum alkyl)/an alkyl halide/a conjugated monomer. For example, the catalyst system used for rubbers having wet-sliding resistant and low rolling resistance developed by Japan JSR. Company is composed of the reaction product of a Lewis base and a rare earth metal compound, an aluminoxane, an aluminum alkyl, and a metal chloride which are reactive with the Lewis base (U.S. Pat. No. 4,468,496 (1985)); the selectivity of butadiene cis 1,4-polymerization catalyzed by using a rare earth metal metal carboxylate/an aluminoxane/a metal chloride is not excess 90%, and the molecular weight distribution is relatively wide (<4.0) (U.S. Pat. No. 6,391,990 B1 (2002), U.S. Pat. No. 6,838,526 B1 (2005), US 200310065083A1, US 2005/0009979 A1). The catalyst systems of a rare earth metal phosphate/an alkylating reagent/a halogen donor or a rare earth metal phosphate/an alkylating reagent/a halogen donor/a conjugated monomer applied by French Mechelin Company can catalyze diene polymerization, wherein the cis 1,4-selectivity is increased to 98% or more. However, in order to realize a cis 1,4-selectivity more than 99%, the polymerization temperature should be lowered to −55° C., and additionally, the rubber has a Mooney point of 80 or less at 100° C. (U.S. Pat. No. 6,838,534 B2 (2005), U.S. Pat. No. 6,858,686 B2 (2005) U.S. Pat. No. 6,949,489 B1 (2005), U.S. Pat. No. 6,992,157 B2 (2006)). The patent applications U.S. Pat. No. 6,713,565 B2, U.S. Pat. No. 7,022,783B2 (2006), US H2036H (2002) and US 2005/0137338A1 (2005) by the Goodyear Tire & Rubber Company relate to a catalyst system of a neodymium carboxylate/an aluminum alkyl/a halogen-containing compound/a conjugated monomer, which can catalyze the highly cis 1,4-polymerization of isoprene or the random copolymerization of isoprene and butadiene, wherein the cis 1,4-selectivity can be 98% or more. A catalyst system of a rare earth metal metallocene/an aluminum alkyl/an organic boron salt cations applied by the researchers of Riken has very highly catalytic activity on the homopolymerization of a conjugated olefine and the copolymerization of a conjugated olefine with a halogen-containing olefine, and additionally, the polymerization reaction is characterized by livingness mode (US 2002/0119889, U.S. Pat. No. 6,596,828 (2003), U.S. Pat. No. 6,960,631 B2, U.S. Pat. No. 6,683,140 B2). However, in order to obtain a cis 1,4-selectivity of 95% or more, the reaction must be performed at a polymerization temperature below −20° C.

The inventors have found a three-component cationic type catalyst system composed of a NCN-diimine pincer type rare earth metal halide, an aluminum alkyl and an organic boron salt, which has a cis 1,4-selectivity above 98% on butadiene or isoprene polymerization and this cis 1,4-selectivity can be maintained in a temperature range of 20-80° C. The catalytic efficiency of the catalyst system is about 20%. The above described catalyst system is completely different from any one of the catalyst systems reported previously (Reference: Wei Gao, Dongmei Cui, *J. Am. Chem. Soc.* 2008, 130, 4984-4991; Chinese Patent 200710056309.2).

SUMMARY OF THE INVENTION

1. Object of the Invention

An object of the invention is to provide a bi-component catalyst system composed only of a NCN-imine pincer type rare earth metal complex and an alkylating reagent, as well as a process for preparing polyisoprene and polybutadiene having high cis 1,4-content, narrow molecular weight distribution and stretching crystallization capability, by performing a highly cis 1,4-selective polymerization of isoprene and butadiene in a manner of high activity, high efficiency and non-polution using the catalyst system in a hydrocarbon solvent or under bulk conditions.

2. Technical Contents

The first aspect of the invention relates to a bi-component catalyst system which is composed of the following two components: (a) a NCN-imine pincer type trivalent rare earth metal complex with a representative molecular formula of $[2,6\text{-}(CH=N-R^1)_2\text{-}4\text{-}R^2\text{-}1\text{-}C_6H_2]LnX_2(THF)_n$ (n=0-2); (b) an alkylating reagent. The molar ratio of the alkylating reagent to the NCN-imine pincer type trivalent rare earth metal complex is from (2:1) to (1000:1).

In the NCN-imine pincer type trivalent rare earth metal complex of the invention, Ln is selected from the rare earth metals scandium (Sc), yttrium (Y) and the rare earth metals with an atom number of 57-71 in the periodic table of elements; $R^1$ is hydrogen or an aliphatic hydrocarbyl or an aromatic hydrocarbyl; $R^2$ is hydrogen or a linear or branched alkyl; Xs are the same or different, which are halogen elements or organic groups which can coordinate with rare earth metals.

The alkylating reagent of the invention is selected from aluminum alkyls, alkyl aluminum hydrides, alkyl aluminum chlorides, or aluminoxanes.

The second aspect of the invention relates to a homogeneous catalyst system which is obtained by subjecting (a) the NCN-imine pincer type rare earth metal complex and (b) the alkylating reagent in the bi-component catalyst system of the invention to alkylation reaction.

The third aspect of the invention relates to a process for isoprene or butadiene cis 1,4-selective polymerization, comprising: using the homogeneous catalyst system of the invention in polymerizing isoprene or butadiene in an organic solvent, to obtain highly cis 1,4-polyisoprene or polybutadiene, wherein, the organic solvent is, from a viewpoint of environmental protection, preferably selected from a hydrocarbon solvent such as hexane, pentane or the like, or toluene; or using the catalyst system of the invention in bulk polymerization of isoprene or butadiene, to obtain polyisoprene or polybutadiene having a cis 1,4-content which is the same as or higher than the above described cis 1,4-content.

3. Technical Effects

The bi-component catalyst composition provided in the invention and the catalyst system made of the same can catalyze the highly active, highly cis 1,4-selective polymerization of isoprene and butadiene at a temperature in a range of 20° C.-120° C., to prepare polyisoprene or polybutadiene having an controllable number-average molecular weight in a range of 50,000-3,000,000, a molecular weight distribution less than 3.0, a cis 1,4-content higher than 95% or more, at most more than 99%, as well as stretching crystallization capability. The catalyst system is characterized in that it maintains the highly cis 1,4-selectivity under the conditions of high temperature polymerization.

Additionally, the hi-component catalyst composition and the catalyst system of the invention can be dissolved in an organic solvent, especially, it can be dissolved in the low toxic/nontoxic $C_5$-$C_{20}$ aliphatic hydrocarbon solvents such as hexane to form a homogeneous catalyst system, avoiding the use of chlorobenzene or the like which are harmful to human body or the environment, and therefore, the bi-component catalyst composition and the catalyst system can be used in industrial production; and particularly, the catalyst system of the invention can catalyze the bulk polymerization of conjugated dienes in a simple process, without disadvantageously influencing the structure and performance of the obtained product.

DESCRIPTION OF DRAWING

FIG. 1 is a stress-strain curve of the polyisoprene obtained by the bulk polymerization of isoprene using the rare earth metal complex 8/triisobutyl aluminium catalyst system of the invention (application example 50).

SPECIFIC MODES FOR CARRYING OUT THE INVENTION

1. Bi-Component Catalyst System

The bi-component catalyst system applicable to the cis 1,4-selective polymerization of isoprene or butadiene of the invention is composed of (a) a NCN-imine pincer type rare earth metal complex as a major catalyst and (b) an alkylating reagent as a cocatalyst.

1.1. NCN-Imine Pincer Type Rare Earth Metal Complex

The NCN-imine pincer type rare earth metal complex of the invention has a molecular formula of [2,6-(CH=N—$R^1$)$_2$-4-$R^2$-1-$C_6H_2$]Ln$X_2$(THF)$_n$, wherein Ln is a rare earth metal; $R^1$ is hydrogen or an aliphatic hydrocarbyl or an aromatic hydrocarbyl; $R^2$ is hydrogen or a linear or branched alkyl; Xs are the same or different, which are halogen elements or organic groups which can coordinate with rare earth metals; THF is tetrahydrofuran; and n=0-2.

The NCN-imine pincer type rare earth metal complex of the invention has a structural formula of:

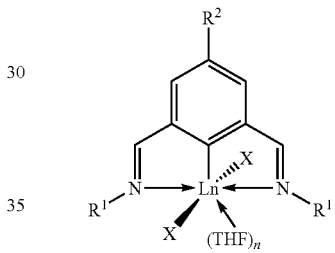

wherein the rare earth metal ion Ln is bonded to the benzene ring at the opposite position of $R^2$ and is coordinated with the N atom of imine, the X group or THF, so as to form an active center of the NCN-imine pincer type rare earth metal complex. Depending on the size and polarity of X, THF (tetrahydrofuran) as a solvent molecule may participate or not participate in the coordination, which does not influence the catalytic performance of the complex.

In the invention, there is no specific limitation on the substituent $R^1$. However, from a viewpoint of steric effect and electron effect, the substituent $R^1$ attached to the nitrogen atom is preferably selected from hydrogen or an aliphatic hydrocarbyl or an aromatic hydrocarbyl.

When $R^1$ is an aliphatic hydrocarbyl, preferably, it is selected from $C_1$-$C_8$ aliphatic hydrocarbyl groups, more preferably, it is selected from methyl, ethyl, iso-propyl, tert-butyl, and most preferably, tert-butyl.

When $R^1$ is an aromatic hydrocarbyl, preferably, $R^1$ is selected from $C_1$-$C_{20}$ aromatic hydrocarbyl groups, more preferably, $R^1$ is selected from aromatic hydrocarbyl groups represented by 2,6-$R^3_2$-4-$R^4$—$C_6H_2$—, wherein $R^3$ and $R^4$ are each independently hydrogen or a $C_1$-$C_8$ hydrocarbyl, preferably, $R^3$ and $R^4$ are each independently hydrogen or a $C_1$-$C_4$ linear or branched alkyl. Specifically, $R^1$ can be selected from phenyl, benzyl, 2,6-dimethyl phenyl, 2,6-diethyl phenyl, 2,6-di-iso-propyl phenyl, 2,6-di-tert-butyl phenyl, 2,6-dimethoxy phenyl, 2,6-diphenyl phenyl, 2,6-dibenzyl phenyl, 2,4,6-trimethyl phenyl, 2,6-dimethyl-4-ethyl phenyl, 2,6-diethyl-4-methyl phenyl, 2,6-di-iso-propyl-4- methyl phenyl or 2,6-di-tert-butyl-4-methyl phenyl, preferably, 2,6-dimethyl phenyl, 2,6-diethyl phenyl, 2,6-di-iso-propyl phenyl.

In the invention, there is no specific limitation on the substituent $R^2$. However, from a viewpoint of steric effect and electron effect, the substituent $R^2$ is preferably hydrogen or a linear or branched alkyl, more preferably, hydrogen or a $C_1$-$C_8$ linear or branched alkyl, and most preferably, $R^2$ is selected from hydrogen, methyl or ethyl.

In the NCN-imine pincer type rare earth metal complex of the invention, there is no specific limitation on X as long as it can coordinate with the rare earth metal metal ions. However, from a viewpoint of the coordination stability and catalytic activity, X is preferably a halogen element or an organic group which can coordinate with rare earth metal ions.

Herein, the halogen element means F, Cl, Br or I, and preferably, Cl or Br.

The preferable organic groups which can coordinate with rare earth metal ions include alkyl groups, alkoxy groups, aryloxy groups or carboxylate groups or the like. The alkyl groups include $CH_2SiMe_3$, $CH_2C_6H_4$-6-$N(CH_3)_2$ or $CH(SiMe_3)_2$, preferably, $CH_2SiMe_3$; alkoxy groups and aryloxy groups include $OCH_3$, $OCH_2CH_3$, $OCH(CH_3)_2$, $OC(CH_3)_3$, $OC_6H_3$-2,6-$(CH_3)_2$, $OC_6H_3$-2,6-$(CH_2CH_3)_2$, $OC_6H_3$-2,6-$(CH(CH_3)_2)_2$, $OC_6H_3$-2,6-$(C(CH_3)_3)_2$, $OC_6H_3$-2,6-$(OCH_3)_2$, or $OC_6H_2$-2,4,6-$(CH_3)_3$, preferably, $OC_6H_3$-2,6-$(CH_3)_2$; and the carboxylate groups include $OCO(CH_2)_6CH_3$.

In the NCN-imine pincer type rare earth metal complex of the invention, when X is a halogen element, there are generally two THF (tetrahydrofuran) molecules participating in the coordination; and when X is an organic groups which can coordinate with rare earth metal ions, THF can participate in the coordination or not participate in the coordination. The coordination of THF is not necessary and will not influence the catalytic performance of the complex.

The particularly preferable NCN-imine pincer type rare earth metal complex of the invention is any one selected from the following complexes 1-15:

Complex 1: $R^1$=2,6-$(CH_3)_2$—$C_6H_3$, $R^2$=H, Ln=Y, X=Cl, n=2;
Complex 2: $R^1$=2,6-$(CH_2CH_3)_2$—$C_6H_3$, $R^2$=$CH_3$, Ln=Y, X=Cl, n=2;
Complex 3: $R^1$=2,6-$(CH(CH_3)_2)_2$—$C_6H_3$, $R^2$=$CH_2CH_3$, Ln=Y, X=Cl, n=2;
Complex 4: $R^1$=2,6-$(CH_2CH_3)_2$—$C_6H_3$, $R^2$=H, Ln=Nd, X=Cl, n=2;
Complex 5: $R^1$=2,6-$(CH_2CH_3)_2$—$C_6H_3$, $R^2$=H, Ln=Gd, X=Cl, n=2;
Complex 6: $R^1$=2,6-$(CH_2CH_3)_2$—$C_6H_3$, $R^2$=H, Ln=Ho, X=Cl, n=2,
Complex 7: $R^1$=2,6-$(CH_2CH_3)_2$—$C_6H_3$, $R^2$=H, Ln=Er, X=Cl, n=2,
Complex 8: $R^1$=2,6-$(CH_2CH_3)_2$—$C_6H_3$, $R^2$=H, Ln=Dy, X=Cl, n=2,
Complex 9: $R^1$=2,6-$(CH_2CH_3)_2$—$C_6H_3$, $R^2$=H, Ln=Pr, X=Cl, n=2,
Complex 10: $R^1$=2,6-$(CH_2CH_3)_2$—$C_6H_3$, $R^2$=H, Ln=La, X=Br, n=2;
Complex 11: $R^1$=2,6-$(CH_2CH_3)_2$—$C_6H_3$, $R^2$=H, Ln=Ho, X=$CH_2SiMe_3$, n=2;
Complex 12: $R^1$=2,6-$(CH_2CH_3)_2$—$C_6H_3$, $R^2$=H, Ln=Lu, X=$OCO(CH_2)_6CH_3$, n=0;
Complex 13: $R^1$=2,6-$(CH_2CH_3)_2$—$C_6H_3$, $R^2$=H, Ln=Sc; X=$OC_6H_3$-2,6-$(CH_3)_2$, n=1;
Complex 14: $R^1$=$C(CH_3)_3$, $R^2$=$CH_3CH_2$, Ln=Nd, X=Cl, n=2; and
Complex 15: $R^1$=2,6-$(CH_2CH_3)_2$—$C_6H_3$, $R^2$=H, Ln=Y, X=$OCH(CH_3)_2$, n=2.

1.2. Alkylating Reagent

The effect of the alkylating reagent of the invention is to react with the NCN-imine pincer type rare earth metal complex as a major catalyst to form a rare earth metal-carbon bond functioning as the main catalysis. In the invention, there is no particular limitation on the alkylating reagent, however, from a viewpoint of the reactivity with the NCN-imine pincer type rare earth metal complex, the alkylating reagent is preferably selected from aluminum alkyls with a molecular formula of $AlR_3$, alkyl aluminum hydrides with a molecular formula of $HAlR_2$, alkyl aluminum chlorides with a molecular formula of $AlR_2Cl$, or aluminoxanes.

The aluminum alkyls are selected from trimethyl aluminum, triethyl aluminum, tri-n-propyl aluminum, tri-n-butyl aluminum, tri-iso-propyl aluminum, triisobutyl aluminium, triamyl aluminum, trihexyl aluminum, tricyclohexyl aluminum, trioctyl aluminum, triphenyl aluminum, tri-p-tolyl aluminum, tribenzyl aluminum, ethyldibenzyl aluminum, ethyl di-p-tolyl aluminum, diethyl benzyl aluminum, preferably, triisobutyl aluminium, triamyl aluminum or trihexyl aluminum; the alkyl aluminum hydrides are selected from dimethyl aluminum hydride, diethyl aluminum hydride, di-n-propyl aluminum hydride, di-n-butyl aluminum hydride, di-iso-propyl aluminum hydride, di-iso-butyl aluminum hydride, diamyl aluminum hydride, dihexyl aluminum hydride, di-cyclohexyl aluminum hydride, dioctyl aluminum hydride, diphenyl aluminum hydride, di-p-tolyl aluminum hydride, dibenzyl aluminum hydride, ethyl benzyl aluminum hydride, ethyl p-tolyl aluminum hydride, preferably, di-iso-propyl aluminum hydride or di-iso-butyl aluminum hydride; the alkyl aluminum chlorides are selected from dimethyl aluminum chloride, diethyl aluminum chloride, di-n-propyl aluminum chloride, di-n-butyl aluminum chloride, di-iso-propyl aluminum chloride, di-iso-butyl aluminum chloride, diamyl aluminum chloride, dihexyl aluminum chloride, di-cyclohexyl aluminum chloride, dioctyl aluminum chloride, diphenyl aluminum chloride, di-p-tolyl aluminum chloride, dibenzyl aluminum chloride, ethyl benzyl aluminum chloride, ethyl p-tolyl aluminum chloride, preferably, di-iso-propyl aluminum chloride di-iso-butyl aluminum chloride, diamyl aluminum chloride; the aluminoxanes are selected from methyl aluminoxane, ethyl aluminoxane, n-propyl aluminoxane, n-butyl aluminoxane, preferably, methyl aluminoxane.

1.3. The Ratio of the NCN-Imine Pincer Type Rare Earth Metal Complex to the Alkylating Reagent In the bi-component catalyst composition of the invention, there is no particular limitation on the ratio of the NCN-imine pincer type rare earth metal complex to the alkylating reagent as long as the amount of the alkylating reagent as a cocatalyst is not less than that of the NCN-imine pincer type rare earth metal complex as a main catalyst. However, in order to ensure the activity of the catalyst sufficiently and remove the impurities in the polymerization system, it is preferable that the ratio of the alkylating reagent to the NCN-imine pincer type rare earth metal complex is (2:1)-(1000:1).

When the alkylating reagent is an aluminum alkyl, the molar ratio of the alkylating reagent to the NCN-imine pincer type rare earth metal complex is preferably (2:1)-(100:1), more preferably, (10:1)-(50:1); when the alkylating reagent is an alkyl aluminum hydride, the molar ratio of the alkylating reagent to the NCN-imine pincer type rare earth metal complex is preferably (2:1)-(100:1), more preferably, (10:1)-(50:1). When the alkylating reagent is an alkyl aluminum hydride, the molar ratio of the alkylating reagent to the NCN-imine pincer type rare earth metal complex is preferably (2:1)-(100:

1), more preferably, (10:1)-(50:1). When the alkylating reagent is an alkyl aluminum chloride, the molar ratio of the alkylating reagent to the NCN-imine pincer type rare earth metal complex is preferably (2:1)-(50:1), more preferably, (5:1)-(15:1); when the alkylating reagent is an aluminoxane, the molar ratio of the alkylating reagent to the NCN-imine pincer type rare earth metal complex is preferably (2:1)-(1000:1), more preferably, (10:1)-(500:1).

2. The Preparation Process of the NCN-Imine Pincer Type Rare Earth Metal Complex The NCN-imine pincer type rare earth metal complex of the invention, represented by a molecular formula of $[2,6-(CH=N-R^1)_2-4-R^2-1-C_6H_2]LnX_2(THF)_n$, can be prepared by the following steps:

step (1): reacting butyl lithium with a NCN-pincer type ligand of $2,6-(CH=N-R^1)_2-4-R^2-1-C_6H_2Br$;

step (2): reacting the product obtained in step (1) with a rare earth metal trihalides to obtain a NCN-imine pincer type rare earth metal halogen complex;

or, further including:

step (3): reacting the NCN-imine pincer type rare earth metal halogen complex obtained in step (2) with a lithium alkyl to obtain a NCN-imine pincer type rare earth metal alkyl complex;

or, further including:

step (4): reacting the NCN-imine pincer type rare earth metal alkyl complex obtained in step (3) with an alcohol, a phenol or a carboxylic acid to obtain a NCN-imine pincer type rare earth metal alkoxy complex, a NCN-imine pincer type rare earth metal phenoloxy complex, or a NCN-imine pincer type rare earth metal carboxyl complex, respectively.

Or, step (4) can further be changed into:

Step (5): reacting the NCN-imine pincer type rare earth metal halogen complex obtained in step (2) with a sodium alkoxide, a sodium phenolate, or a sodium carboxylate to obtain a NCN-imine pincer type rare earth metal alkoxy complex, a NCN-imine pincer type rare earth metal phenoloxy complex, or a NCN-imine pincer type rare earth metal carboxyl complex, respectively.

The preparation process of the NCN-imine pincer type rare earth metal halogen complex of the invention is as shown in formula 1-1:

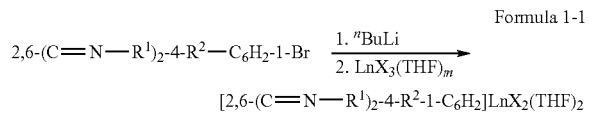

Formula 1-1

$$2,6-(C=N-R^1)_2-4-R^2-C_6H_2-1-Br \xrightarrow[2.\ LnX_3(THF)_m]{1.\ ^nBuLi} [2,6-(C=N-R^1)_2-4-R^2-1-C_6H_2]LnX_2(THF)_2$$

In formula 1-1, Ln, X, $R^1$, $R^2$ are defined as above; THF is the coordinated tetrahydrofuran solvent molecule; m is the coordination number of tetrahydrofuran in a range of 0-3.

Specifically, the reaction can be carried out as follows. Under a condition of −80-10° C., a solution comprising 1.0-3.0 mol/L of lithium butyl in hexane is added into a suspension of a ligand 2,6-(2,6-dialkyl phenyl imino) m-phenyl aldimino-1-bromine in hexane dropwise, wherein the molar ratio of the lithium butyl to the ligand is (0.9:1)-(1.5:1). The mixture is reacted for 3-10 hours. A rare earth metal trihalide is added into the reaction solution wherein the molar ratio of the rare earth metal trihalide to the ligand is 1:1. After the temperature of the reaction solution is raised to room temperature, the reaction is continued for 8-10 hours. The solvent in the mixture is removed under vacuum and the residual is extracted with toluene. After the solution is concentrated, a NCN-imine pincer type rare earth metal halogen complex is obtained;

The NCN-imine pincer type rare earth metal halogen complex is dissolved in toluene and added with a tetrahydrofuran solution of lithium alkyl in equal molar ratio. After reaction for 20 min-1 hour, the solvent in the mixture is removed to obtain a NCN-imine pincer type rare earth metal alkyl compound;

The NCN-imine pincer type rare earth metal alkyl compound is dissolved in toluene and dropped gradually with a tetrahydrofuran solution of an alcohol, a phenol or a carboxylic acid in equal molar ratio, respectively. After reaction for 2-60 min, the solvent in the mixture is removed to obtain a NCN-imine pincer type rare earth metal alkoxy complex, a NCN-imine pincer type rare earth metal phenoloxy complex, or a NCN-imine pincer type rare earth metal carboxyl complex, respectively;

Alternatively, the NCN-imine pincer type rare earth metal halogen complex may be dissolved in toluene and dropped gradually with a tetrahydrofuran solution of a sodium alkoxide, a sodium phenolate, or a sodium carboxylate in equal molar ratio, respectively. The solvent in the mixture is removed after reaction for 2-60 min. The residue is extracted with toluene and filtered. The solvent in the obtained filtrate is removed to obtain a NCN-imine pincer type rare earth metal alkoxy complex, a NCN-imine pincer type rare earth metal phenoloxy complex, or a NCN-imine pincer type rare earth metal carboxyl complex, respectively.

3. The Homogeneous Catalyst System for CIS 1,4-Selective Polymerization of Isoprene or Butadiene The homogeneous catalyst system for the cis 1,4-selective polymerization of isoprene or butadiene of the invention is obtained by subjecting (a) the NCN-imine pincer type rare earth metal complex and (b) the alkylating reagent in the bi-component catalyst system of the invention to alkylation reaction. The reaction is easy to be carried out. Specifically, it can be achieved by mixing (a) and (b) directly or dissolving (a) and (b) in an aliphatic hydrocarbon solvent in a certain proportion, and reacting the same by stirring at 20-80° C. for 0-3 hours. The solvent can be selected according to the dis-solution/dispersion of the NCN-imine pincer type rare earth metal complex and the alkylating reagent in the solvent, as well as the non-toxicity for human body and the environment. The solvent is preferably a $C_5$-$C_{20}$ aliphatic hydrocarbon solvent, most preferably, hexane, pentane or heptane. The ratio of the NCN-imine pincer type rare earth metal complex to the alkylating reagent is the same as that described above. For example, the molar ratio of the aluminum alkyl to the NCN-imine pincer type rare earth metal complex can be (2:1)-(100:1), preferably, (10:1)-(50:1); the molar ratio of the alkyl aluminum hydride to the NCN-imine pincer type rare earth metal complex can be (2:1)-(100:1), preferably, (10:1)-(50:1). The molar ratio of the alkyl aluminum chloride to the NCN-imine pincer type rare earth metal complex can be (2:1)-(50:1), preferably, (5:1)-(15:1); the molar ratio of the aluminoxane to the NCN-imine pincer type rare earth metal complex can be (2:1)-(1000:1), preferably, (10:1)-(500:1).

By the alkylation reaction, a catalyst system for the cis 1,4-selective polymerization of isoprene or butadiene in a form of soluble homogeneous catalyst system can be obtained.

Or, the bi-component soluble homogeneous catalyst system is further added with a little butadiene or isoprene monomers, wherein the molar ratio of the butadiene or isoprene monomers to the rare earth metal complex is 1:2-1:30. The addition of monomers into the bi-component system is not necessary and will not influence the catalytic activity and selectivity of the catalyst system as well as the structure and performance of the polymerization product.

4. Process of the cis 1,4-Selective Polymerization of Isoprene or Butadiene

The process of cis 1,4-selective polymerization of isoprene or butadiene of the invention includes: mixing the bi-component catalyst system of the invention with an organic solvent, and then performing a polymerization reaction of isoprene or butadiene in the obtained solution, or initiating a bulk polymerization of isoprene or butadiene directly without a solvent.

The organic solvent herein can be the same as or different from that used in the alkylation reaction. The preferable examples of the organic solvent include pentane, hexane, heptane and toluene, more preferably, hexane.

The specific steps and conditions of the polymerization process can be as follows: the bi-component catalyst system and a hydrocarbon solvent are placed into an anhydrous and anaerobic treated reactor, wherein the ratio of the solvent to the NCN-imine pincer type rare earth metal complex in the catalyst system is 100-1000 liters/mole. Isoprene or butadiene monomers are added into the reactor, wherein the molar ratio of the isoprene or butadiene monomers to the pincer type rare earth metal complex in the catalyst system is 500:1-40000:1. The polymerization reaction is performed at –20-120° C. for 15 min-24 hours. Then, a solution of 10% hydrochloric acid in ethanol is added to terminate the polymerization reaction. The reaction solution is settled in ethanol, and a white solid product of polyisoprene or polybutadiene is obtained after removing the solvent.

Alternatively, the polymerization reaction can be performed in bulk of isoprene or butadiene in absence of a solvent. The bi-component catalyst system is added with isoprene or butadiene monomers, wherein the molar ratio of the isoprene monomers to the catalyst is 500:1-40000:1. The polymerization reaction is carried out for 1~30 hours under a condition without removing the reaction heat. Without any post-treatment, the obtained polyisoprene or polybutadiene has such micro-structure that the cis 1,4-content is same or even higher than that of the product of the solution polymerization, and the obtained product also has a molecular weight distribution less than 3.0, as well as the stretching crystallization capability. Wherein, the polyisoprene crude rubber has a tensile strength (23° C.) of 2.0-3.8 MPa, vulcanized rubber has a 300% stress at a definite elongation of 10-18 MPa and a tensile strength (23° C.) of 25-28 MPa.

Preparation Example 1

Preparation of Complex 1

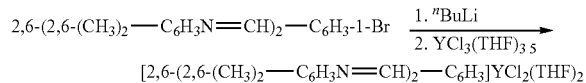

At 0° C., a solution of 1.5 mol/L lithium butyl in hexane (0.8 mL, 1.2 mmol) was added into a suspension of 2,6-bis (N-2,6-dimethyl phenyl aldimino) phenyl-1-bromide (0.5 g, 1.2 mmol) in hexane (20 mL) dropwise. After reaction for 4 hours, YCl$_3$(THF)$_{3.5}$ (0.64 g, 1.44 mmol) was added into the above reaction solution. The reaction solution was raised to room temperature naturally and the reaction was continued for 10 hours. The solvent was removed under vacuum and the residual was extracted with toluene. After the toluene solution was concentrated, 0.57 g bright yellow crystalline complex 1 was obtained with a yield of 74%. For the product, the molecular formula thereof was C$_{32}$H$_{39}$Cl$_2$N$_2$O$_2$Y, element analysis (%): C, 59.65; H, 5.89; N, 4.25.

Preparation Examples 2-9

Preparation of Complexes 2-9

Similar to the synthesis process of complex 1, 2,6-bis[(N-2,6-diethyl phenyl)imine]phenyl-1-bromide, or 2,6-bis[(N-2,6-diethyl phenyl)imine]phenyl-4-methyl 1-bromide or 2,6-bis[(N-2,6-di-iso-propyl phenyl)imine]phenyl-4-ethyl 1-bromide was reacted with lithium butyl, and then reacted with different rare earth metal trihalides to obtain complexes 2-9, respectively. Wherein, complex 2, yield 68%, molecular formula of C$_{37}$H$_{49}$Cl$_2$N$_2$O$_2$Y, element analysis (%): C, 61.79; H, 6.47; N, 3.99. complex 3, yield 86%, molecular formula of C$_{42}$H$_{59}$Cl$_2$N$_2$O$_2$Y, element analysis (%): C, 64.01; H, 7.39; N, 3.37. complex 4: yield 71%, molecular formula of C$_{36}$H$_{47}$Cl$_2$N$_2$O$_2$Nd, element analysis (%): C, 57.01; H, 6.18; N, 3.64. complex 5, yield 65%, molecular formula of C$_{36}$H$_{47}$Cl$_2$N$_2$O$_2$Gd, element analysis (%): C, 56.2; H, 6.03; N, 3.37. complex 6, yield 74%, molecular formula of C$_{36}$H$_{47}$Cl$_2$N$_2$O$_2$Ho, element analysis (%): C, 55.22; H, 6.03; N, 3.61. complex 7, yield 74%, molecular formula of C$_{36}$H$_{47}$Cl$_2$N$_2$O$_2$Er, element analysis (%): C, 55.01; H, 5.77; N, 3.41. complex 8: yield 79%, molecular formula of C$_{36}$H$_{47}$Cl$_2$N$_2$O$_2$Dy, element analysis (%): C, 55.33; H, 5.88; N, 3.09. complex 9, yield 80%, molecular formula of C$_{36}$H$_{47}$Cl$_2$N$_2$O$_2$Pr, element analysis (%): C, 57.06; H, 6.01; N, 3.33.

Preparation Example 10

Preparation of Complex 10

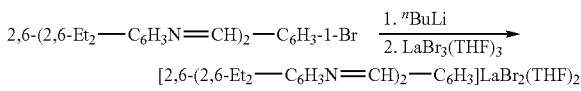

At 10° C., a solution of 1.5 mol/L lithium butyl in hexane (0.8 mL, 1.2 mmol) was added into a suspension of 2,6-bis (N-2,6-diethyl phenyl aldimino) phenyl-1-bromide (0.57 g, 1.2 mmol) in hexane (20 mL) dropwise. After the reaction was carried out at this temperature for 0.5 h, LaBr$_3$(THF)$_3$ (0.84 g, 1.44 mmol) was added into the above reaction solution. The reaction solution was raised to room temperature naturally and the reaction was continued for 15 hours. The solvent was removed under vacuum and the residual was extracted with toluene. After the toluene solution was concentrated, 0.69 g bright yellow crystalline complex 10 was obtained with a yield of 69%. For the product, the molecular formula thereof was $C_{36}H_{47}Br_2N_2O_2La$, element analysis (%): C, 51.47; H, 5.55; N, 3.14.

Preparation Example 11

Preparation of Complex 11

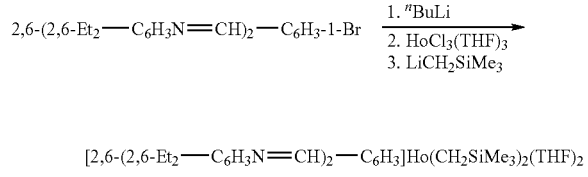

[2,6-(2,6-Et$_2$—C$_6$H$_3$N=CH)$_2$—C$_6$H$_3$]Ho(CH$_2$SiMe$_3$)$_2$(THF)$_2$

At −20° C., a solution of 1.5 mol/L, lithium butyl in hexane (0.8 mL, 1.2 mmol) was added into a suspension of 2,6-bis (N-2,6-diethyl phenyl aldimino) phenyl-1-bromide (0.57 g, 1.2 mmol) in hexane (20 mL). dropwise After the reaction was carried out at this temperature for 3 h, HoCl$_3$(THF)$_3$ (0.68 g, 1.44 mmol) was added into the above reaction solution. The reaction solution was raised to room temperature naturally and the reaction was continued for 12 hours. Then, LiCH$_2$SiMe$_3$ (0.14 g, 1.44 mmol) was added and reacted for 1 h. The solvent in the obtained mixture was removed to obtain a light yellow solid. After the solid was washed with hexane for 3 times to remove the reactants and impurities, 0.76 g solid complex 11 was obtained with a yield of 72%. For the product, the molecular formula thereof was $C_{44}H_{69}N_2O_2Si_2Ho$, element analysis (%): C, 60.00; H, 7.81; N, 3.11.

Preparation Example 12

Preparation of Complex 12

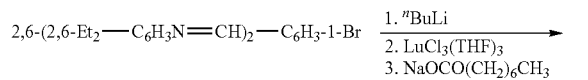

[2,6-(2,6-Et$_2$—C$_6$H$_3$N=CH)$_2$—C$_6$H$_3$]Lu(OCO(CH$_2$)$_6$CH$_3$)$_2$

At 0° C., a solution of 2.5 mol/L lithium butyl in hexane (0.48 mL, 1.2 mmol) was added into a suspension of 2,6-bis (N-2,6-diethyl phenyl aldimino) phenyl-1-bromide (0.57 g, 1.2 mmol) in hexane (20 mL) dropwise. After the reaction was carried out at this temperature for 3 h, LuCl$_3$(THF)$_3$ (0.71 g, 1.44 mmol) was added into the above reaction solution. The reaction solution was raised to room temperature naturally and the reaction was continued for 15 hours. Equimolar NaOCO(CH$_2$)$_6$CH$_3$ was added. After reaction for 10 min, the solvent was removed, and the obtained residue was extracted with toluene and filtered. The solvent in the obtained filtrate is removed to obtain 0.81 g solid complex 12 with a yield of 67%. For the product, the molecular formula thereof was $C_{44}H_{61}N_2O_4Lu$, element analysis (%): C, 60.55; H, 6.67; N, 2.89.

Preparation Example 13

Preparation of Complex 13

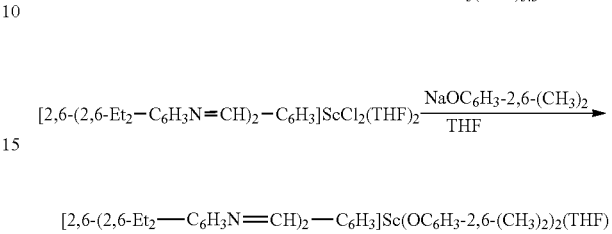

[2,6-(2,6-Et$_2$—C$_6$H$_3$N=CH)$_2$—C$_6$H$_3$]Sc(OC$_6$H$_3$-2,6-(CH$_3$)$_2$)$_2$(THF)

At −10° C., a solution of 1.5 mol/L lithium butyl in hexane (0.8 mL, 1.2 mmol) was added into a suspension of 2,6-bis (N-2,6-diethyl phenyl aldimino) phenyl-1-bromide (0.57 g, 1.2 mmol) in hexane (20 mL) dropwise. After the reaction was carried out at this temperature for 3 h, ScCl$_3$(THF)$_3$ (0.51 g, 1.44 mmol) was added into the above reaction solution. The reaction solution was raised to room temperature naturally and the reaction was continued for 8 hours. Then, a solution of equimolar sodium 2,6-dimethyl phenolate in tetrahydrofuran was added. After reaction for 10 min, the solvent was removed, and the obtained residue was extracted with toluene and filtered. The solvent in the obtained filtrate is removed to obtain 0.82 g complex 13 with a yield of 83%. For the product, the molecular formula thereof was $C_{48}H_{57}N_2O_3Sc$, element analysis (100%): C, 75.42; H, 7.82; N, 3.29.

Preparation Example 14

Preparation Complex 14

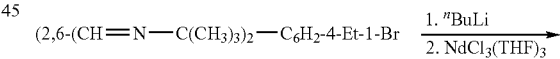

(2,6-(CH=N—C(CH$_3$)$_3$)$_2$—C$_6$H$_2$-4-Et)NdCl$_2$(THF)$_2$

At −80° C., a solution of 3.0 mol/L lithium butyl in hexane (0.4 mL, 1.2 mmol) was added into a suspension of 2,6-bis (N-tert-butyl aldimino) phenyl-4-ethyl-1-bromide (0.36 g, 1.2 mmol) in hexane (20 mL) dropwise. After the reaction was carried out at this temperature for 3 h, NdCl$_3$(THF)$_3$ (0.84 g, 1.44 mmol) was added into the above reaction solution. The reaction solution was raised to room temperature naturally and the reaction was continued for 8 hours. The solvent was removed under vacuum and the residual was extracted with toluene. After the toluene solution was concentrated, 0.46 g bright yellow crystalline complex 14 was obtained with a yield of 61%. For the product, the molecular formula thereof was $C_{26}H_{43}Cl_2N_2O_2Nd$, element analysis (%): C, 48.90; H, 6.41; N, 4.36;

Preparation Example 15

Preparation of Complex 15

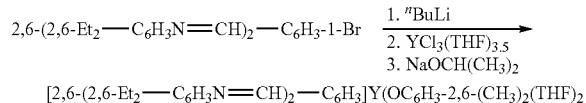

2,6-(2,6-Et$_2$—C$_6$H$_3$N=CH)$_2$—C$_6$H$_3$-1-Br  
1. $^n$BuLi
2. YCl$_3$(THF)$_{3.5}$
3. NaOCH(CH$_3$)$_2$

[2,6-(2,6-Et$_2$—C$_6$H$_3$N=CH)$_2$—C$_6$H$_3$]Y(OC$_6$H$_3$-2,6-(CH$_3$)$_2$)(THF)$_2$

At −10° C., a solution of 1.5 mol/L lithium butyl in hexane (0.8 mL, 1.2 mmol) was added into a suspension of 2,6-bis (N-2,6-diethyl phenyl aldimino) phenyl-1-bromide (0.57 g, 1.2 mmol) in hexane (20 mL) dropwise. After the reaction was carried out at this temperature for 3 h, YCl$_3$(THF)$_{3.5}$ (0.64 g, 1.44 mmol) was added into the above reaction solution. The reaction solution was raised to room temperature naturally and the reaction was continued for 8 hours. Then, a solution of equimolar sodium isopropoxide in tetrahydrofuran was added. After reaction for 10 min, the solvent was removed, and the obtained residue was extracted with toluene and filtered. The solvent in the obtained filtrate is removed to obtain 0.64 g complex 15 with a yield of 71%. For the product, the molecular formula thereof was C$_{42}$H$_{61}$N$_2$O$_4$Y, element analysis (100%); C, 67.13; H, 8.05; N, 3.44.

Application Examples for Polymerization

Application Example 1

At room temperature, to an anhydrous and anaerobic treated 25 ml polymerization bottle, 10 μmol of rare earth metal complex 1, 100 μmol of Al($^i$Bu)$_3$ and 6 ml of n-hexane solvent were added. After the mixture was reacted for 3 h at 20° C., 5 mmol of isoprene monomers (the molar ratio of the monomer to the catalyst was 500:1) were added. The polymerization bottle was placed into a 25° C. thermostat bath and reacted for 4 h with stirring. After the reaction was terminated by adding 1 ml of a solution of 10% hydrochloric acid (volume ratio) in ethanol, the reaction solution was poured into ethanol and settled to obtain a white polyisoprene solid. The solid was placed into a vacuum drying oven and dried at 40° C. for 48 hours. The obtain product had a net weight of 0.17 g and a conversion of 50%. The polyisoprene had M$_n$=135,000, M$_w$/M$_n$=1.77, as analyzed by GPC, and a cis 1,4-content of 97.7%.

Application Examples 2-9

Table 1

On a basis of the application example 1, the influence of the types of the center metals in catalysts and the addition amount of monomers on the isoprene polymerization was investigated. The polymerization conditions for the application examples 2-9 were substantially the same as that of the application example 1. The researching results indicated that complexes 2-9 all had very high catalytic activity on diene polymerization. Although the center rare earth metal ions of the catalysts were of different types, all of them could result in polymers with highly cis 1,4-content. At the same time, the polymerization reactions were controllable. The molecular weights of the polymers could be controlled by altering the proportion of the monomers to the catalyst. The molecular weight distributions of the polymers were less than 2.0.

TABLE 1

Influence of central metals on isoprene polymerization

| entry | cat | Al | Al:cat | hexane (mmol/L) | IP:cat | T$_p$ (° C.) | time (h) | conv (%) | M$_n$ | M$_w$/M$_n$ | 1,4-cis (%) |
|---|---|---|---|---|---|---|---|---|---|---|---|
| 1 | 1 | Al$^i$Bu$_3$ | 10 | 1.67 | 500 | 25 | 4 | 50 | 13.5 | 1.77 | 97.7 |
| 2 | 2$^a$ | Al$^i$Bu$_3$ | 10 | 1.33 | 1000 | 25 | 4 | 100 | 45.3 | 1.72 | 98.5 |
| 3 | 2$^b$ | Al$^i$Bu$_3$ | 10 | 1.00 | 2000 | 25 | 5 | 100 | 79.3 | 1.81 | 98.8 |
| 4 | 4$^c$ | Al$^i$Bu$_3$ | 10 | 0.40 | 3000 | 25 | 6 | 100 | 95.3 | 1.79 | 98.7 |
| 5 | 5 | Al$^i$Bu$_3$ | 20 | 0.33 | 5000 | 25 | 10 | 100 | 134.4 | 1.87 | 98.6 |
| 6 | 6 | Al$^i$Bu$_3$ | 10 | 1.33 | 1000 | 25 | 4 | 90 | 36.6 | 1.77 | 98.5 |
| 7 | 7 | Al$^i$Bu$_3$ | 10 | 1.33 | 1000 | 25 | 4 | 98 | 43.6 | 1.69 | 98.7 |
| 8 | 8 | Al$^i$Bu$_3$ | 10 | 1.33 | 1000 | 25 | 4 | 92 | 40.1 | 1.84 | 90.2 |
| 9 | 9 | Al$^i$Bu$_3$ | 10 | 1.33 | 1000 | 25 | 4 | 98 | 13.8 | 1.88 | 97.1 |

$^a$complex 2 and Al($^i$Bu)$_3$ were subjected to alkylation reaction at 40° C. for 2 hours in n-hexane solvent;
$^b$complex 2 and Al($^i$Bu)$_3$ were subjected to alkylation reaction at 60° C. for 1 hour in n-hexane solvent;
$^c$complex 4 and Al($^i$Bu)$_3$ were subjected to alkylation reaction at 80° C. for 0.5 hour in n-hexane solvent;

Other unspecified conditions for the reaction between the complexes and alkylating reagent were at normal temperature for 1 h.

Application Example 10

At room temperature, to an anhydrous and anaerobic treated 200 ml polymerization bottle, 20 μmol of pincer type rare earth metal complex 10, 400 μmol of Al($^i$Bu)$_3$ and 50 ml of n-hexane solvent were added. After the mixture was reacted for 3 h at 20° C., 200 mmol of isoprene monomers (the molar ratio of the monomer to the catalyst was 10000:1) were added. The polymerization bottle was placed into a 25° C. thermostat bath and reacted for 20 h with stirring. After the reaction was terminated by adding 10 ml of a solution of 10% hydrochloric acid (volume ratio) in ethanol, the reaction solution was poured into ethanol and settled to obtain a white polyisoprene solid. The solid was placed into a vacuum drying oven and dried at 40° C. for 48 hours. The obtain product had a net weight of 13.6 g and a conversion of 100%. The polyisoprene had M$_n$=1,595,000, M$_w$/M$_n$=1.65 as analyzed by GPC, and a cis 1,4-content of 98.7%.

Application Examples 11-19

Table 2

On a basis of the application example 10, the influence of the types of cocatalysts and (X) groups on the isoprene polymerization was investigated. The results indicated that the X groups had no influence on the activity and selectivity of the catalysts, but the cocatalysts had relatively obvious influence on the activity and selectivity of the catalysts.

TABLE 2

The influence of the types of cocatalysts and (X) groups on the isoprene polymerization

| entry | cat | Al | Al:cat | hexane (mmol/L) | IP:cat | $T_p$ (° C.) | time (h) | conv (%) | $M_n$ | $M_w/M_n$ | 1,4-cis (%) |
|---|---|---|---|---|---|---|---|---|---|---|---|
| 10 | 10 | Al$^i$Bu$_3$ | 20 | 0.4 | 10000 | 25 | 20 | 100 | 159.5 | 1.65 | 98.7 |
| 11 | 11 | Al$^i$Bu$_3$ | 40 | 0.1 | 40000 | 25 | 30 | 98.2 | 200.6 | 1.53 | 98.8 |
| 12 | 12 | HAliPr2 | 5 | 1.67 | 500 | 25 | 13 | 100 | 13.7 | 1.64 | 98.5 |
| 13 | 13 | MAO | 100 | 1.67 | 500 | 25 | 4 | 100 | 12.7 | 1.69 | 98.5 |
| 14 | 13 | MAO | 50 | 1.67 | 500 | 25 | 4 | 10 | 1.30 | 1.29 | 97.5 |
| 15 | 13 | MAO | 1000 | 1.67 | 500 | 25 | 4 | 100 | 6.3 | 2.19 | 91.5 |
| 16 | 2 | AlMe$_3$ | 10 | 1.67 | 500 | 25 | 4 | 50 | 10.5 | 1.79 | 97.7 |
| 17 | 2 | AlEt$_3$ | 10 | 1.67 | 500 | 25 | 4 | 70 | 11.7 | 1.63 | 97.8 |
| 18 | 14 | Al$^i$Bu$_3$ | 10 | 1.33 | 1000 | 25 | 4 | 89 | 30.1 | 1.85 | 89.9 |
| 19 | 15 | Al$^i$Bu$_3$ | 10 | 1.33 | 1000 | 25 | 4 | 94 | 11.3 | 1.86 | 97.2 |

Application Example 20

At room temperature, to an anhydrous and anaerobic treated 50 ml polymerization bottle, 20 μmol of rare earth metal complex 2, 200 μmol of Al($^i$Bu)$_3$ and 15 ml of n-hexane solvent were added. After the mixture was reacted for 3 h at 20° C., 20 mmol of isoprene monomers (the molar ratio of the monomer to the catalyst was 1000:1) were added. The polymerization bottle was placed into a 40° C. thermostat bath and reacted for 3 h with stirring. After the reaction was terminated by adding 1 ml of a solution of 10% hydrochloric acid (volume ratio) in ethanol, the reaction solution was poured into ethanol and settled to obtain a white polyisoprene solid. The solid was placed into a vacuum drying oven and dried at 40° C. for 48 hours. The obtain product had a net weight of 1.36 g and a conversion of 100%. The polyisoprene had $M_n$=407,000, $M_w/M_n$=1.79 as analyzed by GPC, and a cis 1,4-content of 98.4%.

Application Examples 21-27

On a basis of the application example 20, the influence of the polymerization temperature and the addition amount of aluminum alkyl on the isoprene polymerization was investigated. The results indicated that the amount of the alkylating reagent did not influent the 1,4-content of the polymer. Because the addition of the aluminum alkyl induced partial chain transfer, excess addition would decrease the molecular weight of the obtain polymer. Additionally, the polymerization reaction could carried out successfully at −20° C.-80° C. Specifically, with the increment of the polymerization temperature, the cis 1,4-content in the polymeric product did not decrease obviously, which indicated that this system was less sensitive to the polymerization temperature. This feature favored the industrial production.

Application Example 28

At room temperature, to an anhydrous and anaerobic treated 25 ml polymerization bottle, 10 μmol of rare earth metal complex 11, 100 μmol of Al($^i$Bu)$_3$ and 6 ml of n-hexane solvent were added. After the mixture was reacted for 3 h at 20° C., 5 mmol of butadiene monomers (the molar ratio of the monomer to the catalyst was 500:1) were added. The polymerization bottle was placed into a 25° C. thermostat bath and reacted for 4 h with stirring. After the reaction was terminated by adding 1 ml of a solution of 10% hydrochloric acid (volume ratio) in ethanol, the reaction solution was poured into ethanol and settled to obtain a white polybutadiene solid. The solid was placed into a vacuum drying oven and dried at 40° C. for 48 hours. The obtain product had a net weight of 0.27 g and a conversion of 100%. The polybutadiene had $M_n$=105,000, $M_w/M_n$=1.79 as analyzed by GPC, and a cis 1,4-content of 99.7%.

Application Examples 29-46

On a basis of the application example 28, the application perspective in butadiene polymerization of the catalyst system of the invention which could polymerize butadiene in a manner of highly cis 1,4-selectivity was investigated. It was found that the catalyst system can also catalyze the cis 1,4-polymerization of butadiene in high selectivity. The influences of factors such as the types of the center metals in the complexes, the substituents, the X groups, the types of the cocatalysts, the polymerization temperature and the addition amount of monomers or the like, on the cis-1,4 microstructure of polybutadiene, and the molecular weight and the distribution thereof, were all coincident with those in the case of catalyzing the isoprene polymerization, see table 4. The polymerization conditions were similar to those for the application example 28.

TABLE 3 the polymerization temperature and the addition amount of aluminum alkyl on the isoprene polymerization

| entry | cat | Al | Al:cat | hexane (mmol/L) | IP:cat | $T_p$ (° C.) | time (h) | conv (%) | $M_n$ | $M_w/M_n$ | 1,4-cis (%) |
|---|---|---|---|---|---|---|---|---|---|---|---|
| 20 | 2 | Al$^i$Bu$_3$ | 10 | 1.33 | 1000 | 40 | 3 | 100 | 40.7 | 1.79 | 98.4 |
| 21 | 2 | Al$^i$Bu$_3$ | 10 | 1.33 | 1000 | 60 | 3 | 98 | 43.8 | 1.88 | 98.1 |
| 22 | 2 | Al$^i$Bu$_3$ | 10 | 1.33 | 1000 | 80 | 1 | 94 | 41.3 | 1.86 | 97.7 |
| 23 | 2 | Al$^i$Bu$_3$ | 20 | 1.33 | 1000 | −20 | 20 | 875 | 48.99 | 1.81 | 99.7 |
| 24 | 2 | Al$^i$Bu$_3$ | 20 | 1.33 | 1000 | 25 | 1 | 100 | 28.99 | 1.81 | 98.7 |
| 25 | 2 | Al$^i$Bu$_3$ | 40 | 1.33 | 1000 | 25 | 0.5 | 100 | 14.85 | 2.09 | 98.6 |
| 26 | 2 | Al$^i$Bu$_3$ | 100 | 1.33 | 1000 | 25 | 0.5 | 100 | 5.01 | 2.81 | 98.1 |
| 27 | 2 | Al$^i$Bu$_3$ | 2 | 1.33 | 1000 | 25 | 10 | 63 | 7.01 | 1.81 | 98.1 |

TABLE 4

The polymerization reaction of butadiene

| entry | cat | Al | Al:cat | hexane (mmol/L) | BD:cat | $T_P$ (°C.) | time (h) | conv (%) | $M_n$ | $M_w/M_n$ | 1,4-cis (%) |
|---|---|---|---|---|---|---|---|---|---|---|---|
| 28 | 11 | Al$^i$Bu$_3$ | 10 | 1.67 | 500 | 25 | 4 | 100 | 10.5 | 1.79 | 99.7 |
| 29 | 12 | $^i$Bu$_2$AlCl | 5 | 0.67 | 1000 | 25 | 4 | 50 | 17.3 | 1.64 | 99.5 |
| 30 | 13 | Al$^i$Bu$_3$ | 10 | 0.5 | 2000 | 25 | 5 | 100 | 64.3 | 1.57 | 99.8 |
| 31 | 4 | Al$^i$Bu$_3$ | 10 | 0.4 | 3000 | 25 | 6 | 100 | 85.7 | 1.57 | 99.7 |
| 32 | 5 | Al$^i$Bu$_3$ | 20 | 0.33 | 5000 | 25 | 10 | 100 | 127.7 | 1.56 | 99.9 |
| 33 | 10 | Al$^i$Bu$_3$ | 20 | 0.2 | 10000 | 25 | 20 | 100 | 149.4 | 1.63 | 99.8 |
| 34 | 11 | Al$^i$Bu$_3$ | 40 | 0.1 | 40000 | 25 | 30 | 98.2 | 179.7 | 1.61 | 99.6 |
| 35 | 12 | Al$^i$Bu$_3$ | 10 | 1.67 | 500 | 25 | 4 | 100 | 9.7 | 1.64 | 99.5 |
| 36 | 13 | Al$^i$Bu$_3$ | 10 | 1.67 | 500 | 25 | 4 | 100 | 8.1 | 1.59 | 99.5 |
| 37 | 2 | Al$^i$Bu$_3$ | 10 | 0.67 | 1000 | 40 | 2 | 100 | 34.3 | 1.68 | 99.4 |
| 38 | 11 | Al$^i$Bu$_3$ | 10 | 0.67 | 1000 | 60 | 1 | 93 | 31.7 | 1.68 | 98.7 |
| 39 | 2 | Al$^i$Bu$_3$ | 10 | 0.67 | 1000 | 80 | 1 | 96 | 29.7 | 1.79 | 97.9 |
| 40 | 11 | Al$^i$Bu$_3$ | 10 | 0.67 | 1000 | −20 | 20 | 20 | 23.3 | 1.68 | 100 |
| 41 | 11 | Al$^i$Bu$_3$ | 20 | 0.67 | 1000 | 25 | 3 | 100 | 23.8 | 1.79 | 99.7 |
| 42 | 2 | Al$^i$Bu$_3$ | 40 | 0.67 | 1000 | 25 | 2 | 100 | 17.3 | 1.82 | 99.6 |
| 43 | 2 | Al$^i$Bu$_3$ | 100 | 0.67 | 1000 | 25 | 1 | 100 | 14.2 | 1.84 | 99.4 |
| 44 | 11 | Al$^i$Bu$_3$ | 2 | 0.67 | 1000 | 25 | 20 | 44 | 10.4 | 1.74 | 99.7 |
| 45 | 2 | AlMe$_3$ | 10 | 0.67 | 1000 | 25 | 20 | 52 | 8.83 | 1.69 | 89.2 |
| 46 | 2 | AlEt$_3$ | 10 | 0.67 | 1000 | 25 | 20 | 61 | 8.99 | 1.72 | 88.6 |

Application Example 47

In a glove box, 0.1 mmol of rare earth metal complex 5 was placed into a 25 ml reaction bottle and 30 molar equivalents of Al($^i$Bu)$_3$ were added. After reaction for 30 min at 25° C. under stirring, the obtained mixture became a deep brown clear liquid. Under nitrogen protection, this clear catalyst liquid was added into a 1 L dried and oxygen-removed high pressure reaction kettle. Then, isoprene monomers in a molar mount of 15000 times as much as that of the catalyst were added. A polymerization reaction was performed for 6 hours without cooling circulation, to obtain 101 g polyisoprene with a conversion of 99%. The polyisoprene had a number-average molecular weight of $M_n$=732,000, a molecular weight distribution of $M_w/M_n$=2.1 as analyzed by GPC, and a cis 1,4-content of 99.0%. Mooney value (1+4, 100° C.): 75, crude rubber tensile strength (23° C.)=2.6 MPa. Vulcanized rubber 300% stress at a definite elongation=18 MPa, and tensile strength (23° C.)=27 MPa.

Application Examples 48-59

On a basis of the application example 47, the bulk polymerization process of isoprene was investigated under polymerization conditions similar to that for the application example 47. It was found that, in the presence of this type of catalyst systems, isoprene can be polymerized in a manner of high cis 1,4-selectivity in a 1 or 2 L reaction kettle under conditions of bulk polymerization. The cis 1,4-contents in the obtained products were the same as those of the polymers obtained in solution polymerization, or even higher. Specifically, the crude rubber tensile strengths of the obtained polyisoprene polymers were all above 2.0 MPa, at most up to 3.8 MPa, which was the highest value reported in the literatures and patents to date.

TABLE 5

Bulk polymerization of isoprene

| entry | cat | Al | Al:cat | IP:cat | time (h) | conv (%) | $M_n$ | $M_w/M_n$ | 1,4-cis (%) | Mooney[1] | MPa[2] | MPa[3] | MPa[4] |
|---|---|---|---|---|---|---|---|---|---|---|---|---|---|
| 47[a] | 5 | Al$^i$Bu$_3$ | 30 | 15000 | 6 | 99 | 73.2 | 2.1 | 99 | 75 | 2.6 | 16 | 27 |
| 48[b] | 5 | Al$^i$Bu$_3$ | 30 | 15000 | 5 | 100 | 82.5 | 1.9 | 98.9 | 80 | 2.7 | 17 | 29 |
| 49[c] | 5 | Al$^i$Bu$_3$ | 30 | 10000 | 4 | 98.5 | 60.8 | 2.2 | 99.3 | 65 | 2.5 | 18 | 26 |
| 50 | 8 | Al$^i$Bu$_3$ | 40 | 20000 | 6 | 100 | 156 | 1.6 | 99.4 | 119 | 3.7 | 15 | 28 |
| 51 | 7 | Al$^i$Bu$_3$ | 40 | 30000 | 15 | 99 | 220.7 | 1.84 | 99 | 118 | 3.8 | 16 | 28 |
| 52 | 5 | Al$^i$Bu$_3$ | 40 | 40000 | 30 | 100 | 297.5 | 2.06 | 99 | 123 | 3.8 | 16 | 27 |
| 53 | 5 | AlEt$_3$ | 30 | 20000 | 16 | 99 | 140.6 | 1.95 | 97.9 | 112 | 3.5 | 16 | 27 |
| 54 | 9 | AlEt$_2$Cl | 40 | 500 | 3 | 97 | 30.5 | 2.67 | 95 | 53 | 2.0 | 10 | 25 |
| 55 | 4 | MAO | 100 | 1000 | 6 | 100 | 38.1 | 2.99 | 98.8 | 60 | 2.0 | 16 | 24 |
| 56 | 10 | Al$^i$Bu$_3$ | 30 | 15000 | 6 | 98 | 73.1 | 2.5 | 99 | 77 | 2.8 | 16 | 28 |
| 57 | 11 | Al$^i$Bu$_3$ | 30 | 15000 | 6 | 81 | 35.2 | 2.0 | 95 | 69 | 2.1 | 14 | 25 |
| 58 | 13 | Al$^i$Bu$_3$ | 30 | 10000 | 3 | 97.8 | 59.3 | 2.07 | 98.8 | 76 | 3.3 | 14 | 26 |
| 59[d] | 15 | Al$^i$Bu$_3$ | 30 | 10000 | 5 | 96 | 72.4 | 2.33 | 98 | 78 | 3.7 | 15 | 27 |

[a]The polymerization reaction was carried out at 40° C. for 6 hours;
[b]Complex 5 and Al($^i$Bu)$_3$ in n-hexane solvent were subjected to alkylation reaction at 50° C. for 20 min; and then polymerization reaction was performed at 70° C. for 4 hours.
[c]Complex 5 and Al($^i$Bu)$_3$ in n-hexane solvent were subjected to alkylation reaction at 80° C. for 10 min; and then polymerization reaction was performed for 4 hours without cooling circulation.
[d]Complex 15 and Al($^i$Bu)$_3$ in n-hexane solvent were subjected to alkylation reaction at 50° C. for 60 min; and then polymerization reaction was performed for 5 hours without cooling circulation.

Unless specified otherwise, the conditions for the reaction between the complexes and alkylating reagent were at normal temperature for 1 h.
[1](1+4, 100° C.); [2]crude rubber tensile strength (23° C.); [3] vulcanized rubber 300% stress at a definite elongation; [4]tensile strength (23° C.).

Application Example 60

In a glove box, 0.1 mmol of rare earth metal complex 5 was placed into a 25 ml reaction bottle and 30 molar equivalents of Al($^i$Bu)$_3$ were added. After reaction for 30 min at 25° C. with stirring, the obtained mixture became a deep brown clear liquid. Under nitrogen protection, this clear catalyst liquid was added into a 1 L dried and oxygen-removed high pressure reaction kettle. Then, butadiene monomers in a molar mount of 15000 times as much as that of the catalyst were added. A polymerization reaction was performed for 5 hours without cooling circulation. After removing the un-reacted butadiene monomers in vacuum, 57 g polybutadiene with a conversion of 70% was obtained. The polybutadiene had a number-average molecular weight of $M_n$=652,000, a molecular weight distribution of $M_w/M_n$=2.0 as analyzed by GPC; and a cis 1,4-content of 93.7%.

Application Examples 61-70

On a basis of the application example 60, the bulk polymerization process of butadiene was investigated. It was found that, in the presence of this type of catalyst systems, butadiene can be polymerized in a manner of high cis 1,4-selectivity in a 1 or 2 L reaction kettle under conditions of bulk polymerization. The polymerization conditions were similar to those of the application example 60.

TABLE 6

Bulk polymerization of butadiene

| entry | cat | Al | Al:cat | IP:cat | time (h) | conv (%) | Mn | Mw/Mn | 1,4-cis (%) |
|---|---|---|---|---|---|---|---|---|---|
| 60 | 5 | Al$^i$Bu$_3$ | 30 | 15000 | 5 | 70 | 65.2 | 2.0 | 93.7 |
| 61[a] | 4 | Al$^i$Bu$_3$ | 30 | 15000 | 5 | 71.6 | 68.9 | 1.9 | 94 |
| 62[b] | 5 | Al$^i$Bu$_3$ | 30 | 10000 | 4 | 91 | 45.1 | 2.4 | 95.1 |
| 63 | 3 | Al$^i$Bu$_3$ | 40 | 20000 | 10 | 73 | 69.2 | 1.89 | 94.4 |
| 64 | 7 | Al$^i$Bu$_3$ | 40 | 30000 | 20 | 60 | 71.3 | 1.99 | 94.3 |
| 65 | 5 | Al$^i$Bu$_3$ | 40 | 40000 | 20 | 65 | 89.8 | 2.01 | 93 |
| 66 | 6 | AlEt$_3$ | 30 | 20000 | 16 | 60 | 60.1 | 1.93 | 92 |
| 67 | 5 | AlEt$_2$Cl | 40 | 500 | 2 | 85 | 3.9 | 2.33 | 94 |
| 78 | 4 | MAO | 100 | 1000 | 3 | 80 | 6.2 | 2.99 | 94 |
| 69 | 14 | Al$^i$Bu$_3$ | 20 | 10000 | 3 | 69 | 28.4 | 2.07 | 93.5 |
| 70[c] | 15 | Al$^i$Bu$_3$ | 30 | 10000 | 5 | 70 | 32.4 | 2.33 | 93.6 |

[a]Complex 4 and Al($^i$Bu)$_3$ in n-hexane solvent were subjected to alkylation reaction at 50° C. for 20 min; and then butadiene monomers were added, and polymerized for 5 hours without cooling circulation.
[b]Complex 5 and Al($^i$Bu)$_3$ in n-hexane solvent were subjected to alkylation reaction at 80° C. for 10 min; and then butadiene monomers were added, and polymerized for 4 hours without removing the polymerization heat.
[c]Complex 15 and Al($^i$Bu)$_3$ in n-hexane solvent were subjected to alkylation reaction at 50° C. for 60 min; and then butadiene monomers were added, and polymerized for 5 hours without removing the polymerization heat.

Unless specified otherwise, the conditions for the reaction between the complexes and alkylating reagent were at normal temperature for 1 h.

What is claimed is:

1. A bi-component catalyst system which consists essentially of the following two components: (a) a NCN-imine pincer type trivalent rare earth metal complex with a representative molecular formula of [2,6-(CH=N—R$^1$)$_2$-4-R$^2$-1-C$_6$H$_2$]LnX$_2$(THF)$_n$, wherein Ln is a rare earth metal; R$^1$ is hydrogen or an aliphatic hydrocarbyl or an aromatic hydrocarbyl; R$^2$ is hydrogen or a linear or branched alkyl; Xs are the same or different, which are halogen elements or organic groups which can coordinate with rare earth metals; THF is tetrahydrofuran; n=0-2; (b) an alkylating reagent, wherein the molar ratio of the alkylating reagent to the NCN-imine pincer type trivalent rare earth metal complex is 2:1-1000:1.

2. The bi-component catalyst system as claimed in claim 1, wherein Ln is selected from the group consisting of rare earth metals scandium (Sc), yttrium (Y) and lanthanide elements with an atom number of 57-71 in the periodic table of elements.

3. The bi-component catalyst system as claimed in claim 1, wherein R$^1$ is selected from C$_1$-C$_8$ aliphatic hydrocarbyl groups.

4. The bi-component catalyst system as claimed in claim 3, wherein R$^1$ is selected from the group consisting of methyl, ethyl, iso-propyl, and tert-butyl.

5. The bi-component catalyst system as claimed in claim 1, wherein R$^1$ is selected from C$_6$-C$_{20}$ aromatic hydrocarbyl groups.

6. The bi-component catalyst system as claimed in claim 5, wherein R$^1$ is selected from aromatic hydrocarbyl groups represented by 2,6-R$^3$$_2$-4-R$^4$—C$_6$H$_2$—, wherein R$^3$ and R$^4$ are each independently hydrogen or a C$_1$-C$_8$ hydrocarbyl.

7. The bi-component catalyst system as claimed in claim 6, wherein R$^3$ and R$^4$ are each independently hydrogen or a C$_1$-C$_4$ linear or branched alkyl.

8. The bi-component catalyst system as claimed in claim 5, wherein R$^1$ is selected from the group consisting of phenyl, benzyl, 2,6-dimethyl phenyl, 2,6-diethyl phenyl, 2,6-di-iso-propyl phenyl, 2,6-di-tert-butyl phenyl, 2,6-dimethoxy phenyl, 2,6-diphenyl phenyl, 2,6-dibenzyl phenyl, 2,4,6-trimethyl phenyl, 2,6-dimethyl-4-ethyl phenyl, 2,6-diethyl-4-methyl phenyl, 2,6-di-iso-propyl-4-methyl phenyl and 2,6-di-tert-butyl-4-methyl phenyl.

9. The bi-component catalyst system as claimed in claim 1, wherein R$^2$ is hydrogen or a C$_1$-C$_8$ linear or branched alkyl.

10. The bi-component catalyst system as claimed in claim 9, wherein R$^2$ is hydrogen, methyl or ethyl.

11. The bi-component catalyst system as claimed in claim 1, wherein X is an organic group which can coordinate with the rare earth metal ions, and is selected from the group consisting of alkyl groups, alkoxy groups, aryloxy groups and carboxylate groups.

12. The bi-component catalyst system as claimed in claim 11, wherein the alkyl group is selected from the group consisting of $CH_2SiMe_3$, $CH_2C_6H_4$-6-$N(CH_3)_2$ and $CH(SiMe_3)_2$; the alkoxy group is selected from the group consisting of $OCH_3$, $OCH_2CH_3$, $OCH(CH_3)_2$ and $OC(CH_3)_3$; the aryloxy group is selected from the group consisting of $OC_6H_3$-2,6-$(CH_3)_2$, $OC_6H_3$-2,6-$(CH_2CH_3)_2$, $OC_6H_3$-2,6-$(CH(CH_3)_2)_2$, $OC_6H_3$-2,6-$(C(CH_3)_3)_2$, $OC_6H_3$-2,6-$(OCH_3)_2$, and $OC_6H_2$-2,4,6-$(CH_3)_3$; and the carboxylate group is $OCO(CH_2)_6CH_3$.

13. The bi-component catalyst system as claimed in claim 1, wherein the trivalent rare earth metal complex is any one selected from the following complexes 1-15:

Complex 1: $R^1$=2,6-$(CH_3)_2$—$C_6H_3$, $R^2$=H, Ln=Y, X=Cl, n=2;
Complex 2: $R^1$=2,6-$(CH_2CH_3)_2$—$C_6H_3$, $R^2$=$CH_3$, Ln=Y, X=Cl, n=2;
Complex 3: $R^1$=2,6-$(CH(CH_3)_2)_2$—$C_6H_3$, $R^2$=$CH_2CH_3$, Ln=Y, X=Cl, n=2;
Complex 4: $R^1$=2,6-$(CH_2CH_3)_2$—$C_6H_3$, $R^2$=H, Ln=Nd, X=Cl, n=2;
Complex 5: $R^1$=2,6-$(CH_2CH_3)_2$—$C_6H_3$, $R^2$=H, Ln=Gd, X=Cl, n=2;
Complex 6: $R^1$=2,6-$(CH_2CH_3)_2$—$C_6H_3$, $R^2$=H, Ln=Ho, X=Cl, n=2,
Complex 7: $R^1$=2,6-$(CH_2CH_3)_2$—$C_6H_3$, $R^2$=H, Ln=Er, X=Cl, n=2,
Complex 8: $R^1$=2,6-$(CH_2CH_3)_2$—$C_6H_3$, $R^2$=H, Ln=Dy, X=Cl, n=2,
Complex 9: $R^1$=2,6-$(CH_2CH_3)_2$—$C_6H_3$, $R^2$=H, Ln=Pr, X=Cl, n=2,
Complex 10: $R^1$=2,6-$(CH_2CH_3)_2$—$C_6H_3$, $R^2$=H, Ln=La, X=Br, n=2;
Complex 11: $R^1$=2,6-$(CH_2CH_3)_2$—$C_6H_3$, $R^2$=H, Ln=Ho, X=$CH_2SiMe_3$, n=2;
Complex 12: $R^1$=2,6-$(CH_2CH_3)_2$—$C_6H_3$, $R^2$=H, Ln=Lu, X=$OCO(CH_2)_6CH_3$, n=0;
Complex 13: $R^1$=2,6-$(CH_2CH_3)_2$—$C_6H_3$, $R^2$=H, Ln=Sc; X=$OC_6H_3$-2,6-$(CH_3)_2$, n=1;
Complex 14: $R^1$=$C(CH_3)_3$, $R^2$=$CH_3CH_2$, Ln=Nd, X=Cl, n=2;
Complex 15: $R^1$=2,6-$(CH_2CH_3)_2$—$C_6H_3$, $R^2$=H, Ln=Y, X=$OCH(CH_3)_2$, n=2.

14. The bi-component catalyst system as claimed in claim 1, wherein the alkylating reagent is selected from the group consisting of aluminum alkyls with a molecular formula of $AlR_3$, alkyl aluminum hydrides with a molecular formula of $HAlR_2$, alkyl aluminum chlorides with a molecular formula of $AlR_2Cl$, and aluminoxanes; when the alkylating reagent is an aluminum alkyl or an alkyl aluminum hydride, the molar ratio of the alkylating reagent to the NCN-imine pincer type rare earth metal complex is 2:1-100:1; when the alkylating reagent is an alkyl aluminum chloride, the molar ratio of the alkylating reagent to the NCN-imine pincer type rare earth metal complex is 2:1-50:1; and when the alkylating reagent is an aluminoxane, the molar ratio of the alkylating reagent to the NCN-imine pincer type rare earth metal complex is 2:1-1000:1.

15. The bi-component catalyst system as claimed in claim 14, wherein the aluminum alkyls are selected from the group consisting of trimethyl aluminum, triethyl aluminum, tri-n-propyl aluminum, tri-n-butyl aluminum, tri-iso-propyl aluminum, triisobutyl aluminium, triamyl aluminum, trihexyl aluminum, tricyclohexyl aluminum, trioctyl aluminum, triphenyl aluminum, tri-p-tolyl aluminum, tribenzyl aluminum, ethyldibenzyl aluminum, ethyl di-p-tolyl aluminum and diethyl benzyl aluminum; the alkyl aluminum hydrides are selected from the group consisting of dimethyl aluminum hydride, diethyl aluminum hydride, di-n-propyl aluminum hydride, di-n-butyl aluminum hydride, di-iso-propyl aluminum hydride, di-iso-butyl aluminum hydride, diamyl aluminum hydride, dihexyl aluminum hydride, di-cyclohexyl aluminum hydride, dioctyl aluminum hydride, diphenyl aluminum hydride, di-p-tolyl aluminum hydride, dibenzyl aluminum hydride, ethyl benzyl aluminum hydride and ethyl p-tolyl aluminum hydride; the alkyl aluminum chlorides are selected from the group consisting of dimethyl aluminum chloride, diethyl aluminum chloride, di-n-propyl aluminum chloride, di-n-butyl aluminum chloride, di-iso-propyl aluminum chloride, di-iso-butyl aluminum chloride, diamyl aluminum chloride, dihexyl aluminum chloride, di-cyclohexyl aluminum chloride, dioctyl aluminum chloride, diphenyl aluminum chloride, di-p-tolyl aluminum chloride, dibenzyl aluminum chloride, ethyl benzyl aluminum chloride and ethyl p-tolyl aluminum chloride; and the aluminoxanes are selected from the group consisting of methyl aluminoxane, ethyl aluminoxane, n-propyl aluminoxane and n-butyl aluminoxane.

16. A soluble homogeneous catalyst system obtained by subjecting the NCN-imine pincer type rare earth metal complex and the alkylating reagent in the bi-component catalyst composition as claimed in claim 1 to alkylation reaction.

17. A process for the cis 1,4-selective polymerization of isoprene or butadiene comprising subjecting isoprene or butadiene monomers to polymerization reaction in the presence of the homogeneous catalyst system as claimed in claim 16.

18. The process for the cis 1,4-selective polymerization of isoprene or butadiene as claimed in claim 17, wherein the polymerization reaction of isoprene or butadiene monomers is solution polymerization.

19. The process for the cis 1,4-selective polymerization of isoprene or butadiene as claimed in claim 18, wherein the solvent used in the solution polymerization is pentane, hexane, heptane or toluene.

20. The process for the cis 1,4-selective polymerization of isoprene or butadiene as claimed in claim 17, wherein the polymerization reaction of isoprene or butadiene monomers is bulk polymerization.

\* \* \* \* \*